US009646653B2

(12) United States Patent
Matejka et al.

(10) Patent No.: US 9,646,653 B2
(45) Date of Patent: May 9, 2017

(54) TECHNIQUES FOR PROCESSING AND VIEWING VIDEO EVENTS USING EVENT METADATA

(71) Applicant: AUTODESK, INC., San Rafael, CA (US)

(72) Inventors: Justin Frank Matejka, Newmarket (CA); George Fitzmaurice, Toronto (CA); Tovi Grossman, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 28 days.

(21) Appl. No.: 14/663,382

(22) Filed: Mar. 19, 2015

(65) Prior Publication Data

US 2015/0269968 A1 Sep. 24, 2015

Related U.S. Application Data

(60) Provisional application No. 61/969,342, filed on Mar. 24, 2014.

(51) Int. Cl.
| | |
|---|---|
| *H04N 5/76* | (2006.01) |
| *G11B 27/10* | (2006.01) |
| *H04N 9/806* | (2006.01) |
| *H04N 9/82* | (2006.01) |
| *G11B 27/28* | (2006.01) |
| *G11B 27/32* | (2006.01) |

(52) U.S. Cl.
CPC ............ *G11B 27/102* (2013.01); *G11B 27/28* (2013.01); *G11B 27/323* (2013.01); *H04N 5/76* (2013.01); *H04N 9/806* (2013.01); *H04N 9/8205* (2013.01); *H04N 9/8211* (2013.01)

(58) Field of Classification Search
CPC ....... G11B 27/102; H04N 5/76; H04N 9/8211
See application file for complete search history.

(56) References Cited

U.S. PATENT DOCUMENTS

| | | | |
|---|---|---|---|
| 2010/0061466 A1* | 3/2010 | Gozen ................... | G10L 19/167 375/240.28 |
| 2013/0141643 A1* | 6/2013 | Carson ............... | H04N 21/4307 348/515 |
| 2014/0160351 A1* | 6/2014 | Ejima ..................... | H04N 5/04 348/515 |

* cited by examiner

*Primary Examiner* — Huy T Nguyen
(74) *Attorney, Agent, or Firm* — Artegis Law Group, LLP

(57) ABSTRACT

A computing device for processing a video file. The video file comprises an audio track and contains at least one event comprising a scene of interest. One or more audio criteria that characterize the event are used to detect events using the audio track and an offset timestamp is recorded for each detected event. A set of offset timestamps may be produced for a set of detected events of the video file. The set of offset timestamps for the set of detected events may be used to time align and time adjust a set of real timestamps for a set of established events for the same video file. A user interface (UI) is provided that allows quick and easy search and playback of events of interest across multiple video files.

23 Claims, 15 Drawing Sheets

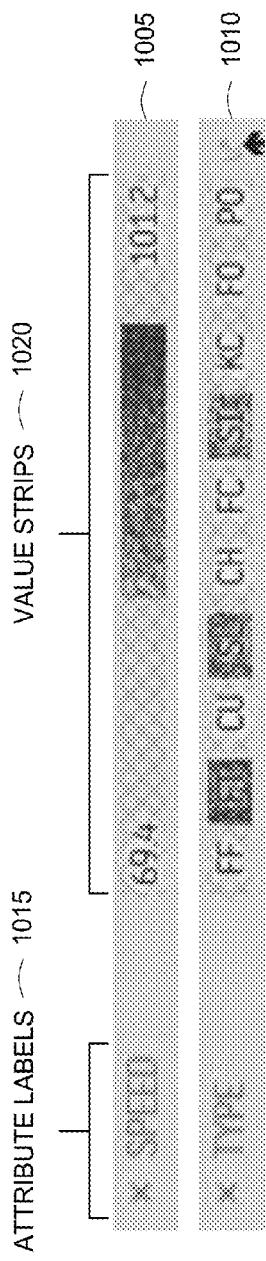
FIG. 10
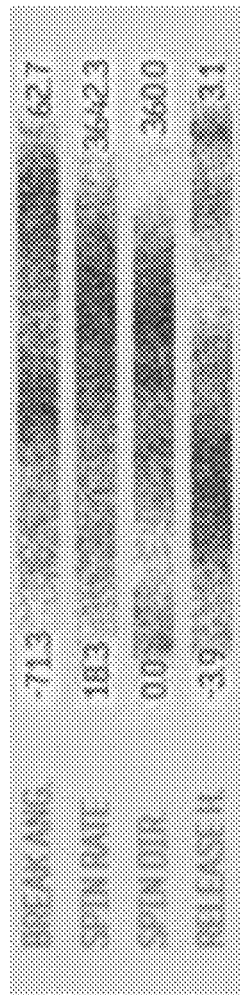
BEFORE HOVERING
DURING HOVERING
FIG. 11

TECHNIQUES FOR PROCESSING AND VIEWING VIDEO EVENTS USING EVENT METADATA

CROSS-REFERENCE TO RELATED APPLICATIONS

This application claims the benefit of U.S. provisional patent application titled "METADATA-BASED VIDEO EXPLORATION," filed on Mar. 24, 2014 and having Ser. No. 61/969,342. The subject matter of this related application is hereby incorporated herein by reference.

BACKGROUND OF THE INVENTION

Field of the Invention

The present invention generally relates to computer science and, more specifically, to techniques for processing and viewing video events using event metadata.

Description of the Related Art

In recent years, the trend of storing large collections of online videos has exploded. As a result, there has been a recent surge in developing ways to allow users to efficiently locate and navigate to scenes of interest (referred to as "events") within videos. However, finding specific scenes or events of interest within a large collection of videos remains an open challenge. For example, consider a baseball fan who wishes to watch all home runs hit by their favorite player during a baseball season. Even if the user manages to create a playlist of all videos (games) where the events of interest (home runs) occurred, it would still be time consuming to watch the entire playlist of videos to view the events of interest within these videos. A current approach to identifying events within videos is to manually view, identify, and record information for relevant events within each video. This manual method of identifying events is a time-consuming and error-prone process. Thus, there is a need for a more efficient technique for identifying relevant events within videos.

Once relevant events within a video are identified and metadata recorded for these events, a user interface is provided that typically allows users to search and view the events. One current approach is to provide metadata search and exploration in the user interface using single attributes (one dimension search). Another approach is to provide search and playback of events in the user interface spanning one video at a time per search. Current user interfaces, however, do not fully leverage the event metadata to allow effective search and playback of events using multiple attributes across multiple videos. Thus, there is also a need for a more effective technique for searching and playing relevant events within videos.

SUMMARY OF THE INVENTION

One embodiment of the invention includes a computer-implemented method for processing a video file. The video file comprises an audio track and contains at least one event comprising a scene of interest. The method includes receiving one or more audio criteria that characterize the event, and determining that the one or more audio criteria are satisfied at a point in time of the audio track. Upon determining that the one or more audio criteria are satisfied, determining that an event is detected at the point in time of the audio track and recording an offset timestamp for the event. The offset timestamp indicates a time offset where the event is detected relative to a beginning of the video file.

One advantage of the disclosed technique is that events of interest in a video file may be efficiently detected and logged in a computer-automated manner.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 10 shows a screenshot of two single-attribute controllers shown in the user interface of FIG. 9, according to one embodiment of the present invention;

FIG. 11 shows a screenshot of a hovering feature of the SACs shown in FIG. 9, according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
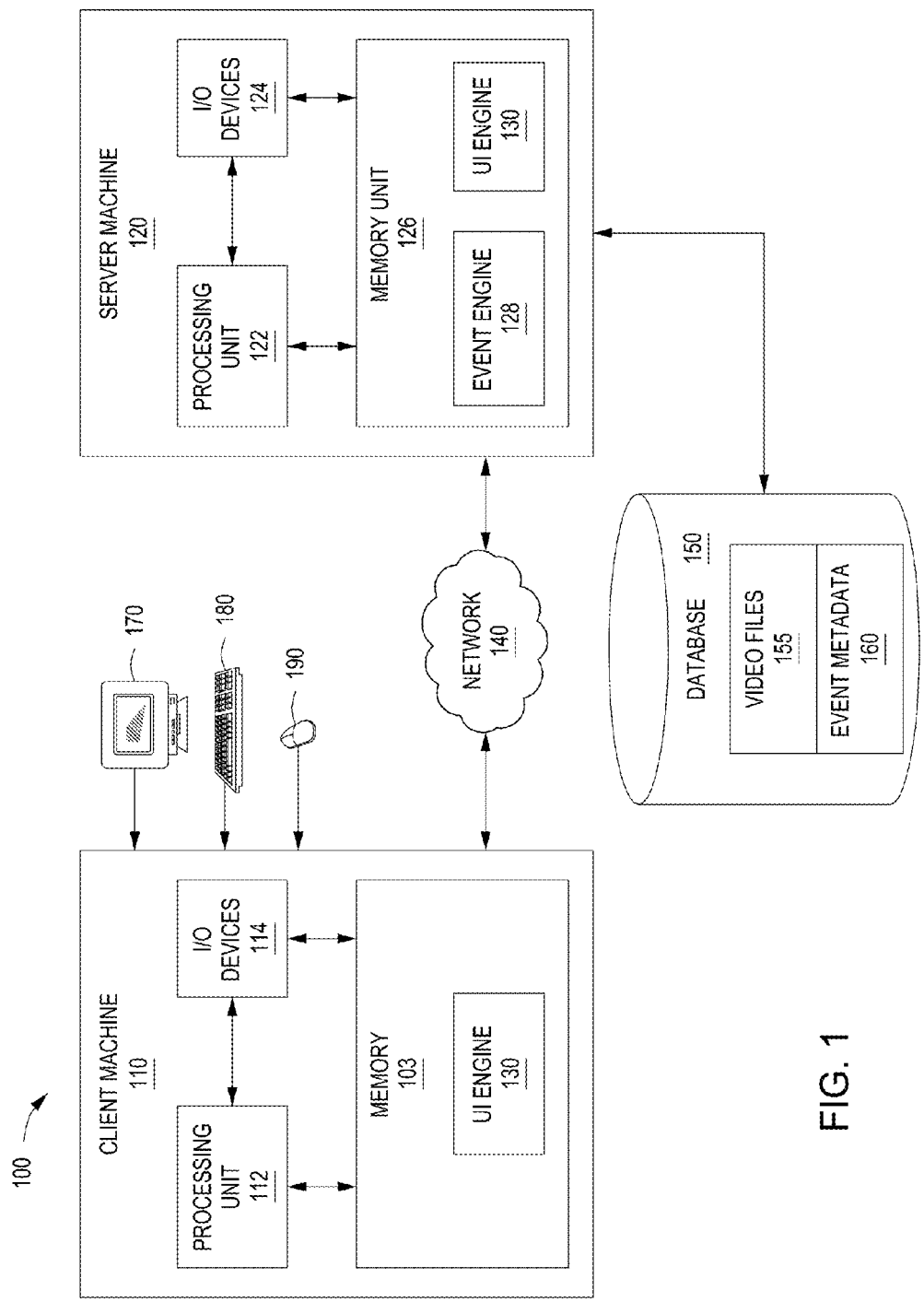
FIG. 1 illustrates a system configured to implement one or more aspects of the present invention.

FIG. 1 illustrates a system 100 configured to implement one or more aspects of the present invention. As shown, the system includes a client machine 110 coupled to a server machine 120 by network 140. Server machine 120 is also coupled to a database 150. Client machine 110 represents a client computing device configured to interact with server machine 120. Client machine 110 may be a workstation, a laptop computer, a tablet or hand-held device, or any other device capable of displaying the output.

Client machine 110 includes processing unit 112 coupled to input/output (I/O) devices 114 and to memory unit 103. Processing unit 112 may be a central processing unit (CPU), a graphics processing unit (GPU), or a combination of different processing units, such as a CPU configured to operate in conjunction with a GPU. In general, processing unit 112 may be any technically feasible hardware unit capable of processing data and/or executing software applications. I/O devices 114 are also coupled to memory 103 and includes devices capable of receiving input, devices capable of producing output, as well as devices capable of communicating via network 140. Client machine 110 communicates with server machine 120 over network 140 using I/O devices 114. Client machine 110 is further coupled to display device 170, keyboard 180, and mouse 190, which afford the end-user access to system 100. Memory 103 further includes a user interface (UI) engine 130.

Server machine 120 is a computing device that may reside within a data center remote from client machine 110. Server machine 120 includes processing unit 122 coupled to I/O devices 124 and to memory unit 126. Processing unit 122 may be a central processing unit (CPU), a graphics processing unit (GPU), or a combination of different processing units, such as a CPU configured to operate in conjunction with a GPU. I/O devices 124 are also coupled to memory unit 126 and may include devices capable of receiving input, such as a keyboard, mouse, or other input elements, as well as devices capable of producing output such as a monitor, printer, or other output elements. Server machine 120 communicates with client machine 110 over network 140 using I/O devices 124. Memory unit 126 further includes event engine 128 and UI engine 130.

Server machine 120 is also coupled to database 150, which organizes and stores video files 155 and event metadata 160. Each video file 155 may have one or more events of interest. Each video file 155 may have corresponding event metadata 160 that describes events contained in the video file 155. In some embodiments, the event engine 128 of the server machine 120 processes video files 155 to detect and log events (independent of the event metadata 160). The event engine 128 may further use the detected events to time align the event metadata 160 and/or perform time adjustments of the event metadata 160. The event engine 128 and its functions are further described in subsequent figures. The UI engine 130 may then be used to quickly and easily search, browse, and playback events of interest using the event metadata 160.

An end-user uses the UI engine 130 to submit queries to search and browse events of interest from video files 155 and receive fast playback of the requested events. The UI engine 130 may reside on the server machine 120 or on a remote client machine 110 that accesses the database 150 via network 140. The end-user may input queries and commands to client machine 110 via display device 170, keyboard 180, mouse 190, and/or other I/O devices 114. In response, client machine 110 initiates a request to server machine 120 to transfer the requested video data and the UI engine 130 manipulates the data provided by server machine 120, in order to create viewable video output via I/O devices 114.

Video Files and Event Metadata

Described herein are techniques and systems for processing and displaying events in video files using event metadata. As known in the art, a video file stores digital video and audio data that may be processed and displaying using program and computer hardware that decodes the video and audio data. A video file typically comprises a container format having video data in a video coding format along with audio data in an audio coding format. The audio data comprises an audio track of the video file that is synchronized with the video data of the video file.

A video file comprises a plurality of video frames, each video frame comprising one of many still images that compose the complete moving video. Video files may be configured to play back at varying frame rates. For example, in North America and Japan, the broadcast standard is 30 frames per second (fps), while 24 fps is common for high-definition video, whereas 25 fps is standard elsewhere in the world. Thus, a single video frame may sometimes be used as a unit of time. For example, if the frame rate is 24 fps, playback of a single video frame is for $\frac{1}{24}^{th}$ second, so each video frame may represent $\frac{1}{24}^{th}$ second. In some embodiments described herein, a frame rate of 24 fps is used as an example, but other frame rates may be used in other embodiments.

A video file may contain several events of interest. An event refers to a scene of interest displayed in the video file. In these embodiments, an event refers to the displayed content of the video file that is of particular interest to a user. An event may comprise and span one or more video frames in the video file. For example, a video file may comprise one baseball game, and the events of interest may be pitches thrown, whereby the video file contains several instances of the event. Each event (pitch thrown) typically comprises and spans several video frames of the video file.

Each video file event may have corresponding event metadata that describes the events in the video file. Each event has corresponding event metadata that describes the particular event in terms of attributes and corresponding attribute values. For example, a pitch event may be described in terms of attributes such as speed and pitch type. Attributes may be classified as discreet or continuous. Discreet attributes have a finite number of possible values, while continuous attributes can have any value between a maximum and minimum value. If the discreet values are numerical, the attribute is considered to be ordered discreet, otherwise it is unordered discreet. These attributes may form the basis of how specific events within a video file are selected for playback, and how the events are visually represented through a user interface. Note that event metadata, as referred to herein, is different and distinct from other types of metadata that describe the video file, such as container metadata specifying title, compression type, frame rate, etc.

Event metadata also includes a timestamp attribute with a time-related value. The timestamp may comprise a "real-time" or an "offset-time" (referred to herein as a real timestamp and an offset timestamp, respectively). The real timestamp for an event indicates the actual real time that the event occurred. The real timestamp may comprise, for example, values for the year, month, day, hour, minute, and second of when the event occurred. The offset timestamp for an event may comprise a time offset of the event relative to a beginning of the video file. In other words, the offset timestamp for an event indicates an amount of time that has elapsed between the beginning of the video file and a point in time of the event in the video file. Thus the offset timestamp specifies the time of the event and the position of the video frames comprising the event relative to the beginning of the video file. Although an event typically comprises a plurality of video frames, the event may have a single timestamp that represents the time (offset time or real time) of the plurality of video frames comprising the event. In contrast, a real timestamp does not indicate a time offset of an event relative to the beginning of the video file.

For some types of video files, there is currently a large amount of event metadata that has been generated describing the video files. For example, large amounts event metadata has been generated for Major League Baseball (MLB) games, the event metadata describing a large variety of different types of events (e.g., pitches, hits, home runs, etc.), each event being described using a large variety of attributes (e.g., pitcher name, speed, pitch type, pitch position, etc.). The event metadata may be downloaded from different sources in different manner, such as download as XML files from MLB Advanced Media department. In some embodiments described herein, the "pitch" is considered the primary event type described in the event metadata, where one pitch is visually represented by one dot. However, in other embodiments, any other type of event for any other type of video file may be used. For example, the event may comprise whenever a gun is fired in a movie, whenever a dog barks in a home video, whenever a cymbal is hit in a music video, etc.

Figure 2:
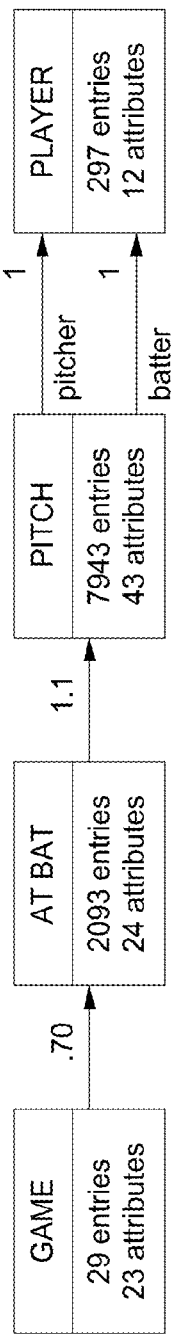
FIG. 2 is a conceptual diagram of an organizational structure for the event metadata stored in the database of FIG. 1, according to one embodiment of the present invention.

In the example of MLB baseball games, a collection of 29 video files of 29 baseball games from the 2013 MLB playoffs is used. The total length of the video files is 105 hours. The metadata for various events in the video files are downloaded and stored to the database 150. FIG. 2 is a conceptual diagram of an organizational structure for the event metadata stored in the database 150 of FIG. 1, according to one embodiment of the present invention. As shown in FIG. 2, various event types may comprise games, at bat, pitches, and players. Each event type may comprise a plurality of events stored as entries having a plurality of attributes. For example, there are a total of 7983 pitch events having 43 different attributes. A subset or all attributes may be selected to be exposed in the user interface. Additional attributes may be dynamically computed from other attributes and included as well. A specific implementation could tune the number of exposed attributes to the expertise level of the target user group.

The event metadata that is currently available for many publically available video files (such as MLB video files) typically comprises only real timestamps for the events. This is problematic as location and retrieval of events within a video file relies on offset timestamps, as offset times of events relative to the beginning of the video file are needed to accurately locate and retrieve the events. In this regard, knowing the real timestamp of a particular event does not assist in locating the particular event within the video file as the real timestamp gives no indication as to the offset from the beginning of the video file. A current method of resolving this issue is to manually determine the offset time of the first event in the video file (referred to as the first offset timestamp) and then apply the first offset timestamp to all remaining events. However, this involves a user watching the video file and manually detecting and noting the offset time of the first event which, even for a small collection of video files, is a time consuming and error prone process.

Automated Detection of Events

In some embodiments, the event engine 128 processes video files to perform automated detection and logging of events of interest by using the audio data (audio tracks) of the video files. For each video file, the event engine 128 produces an offset timestamp for each detected event, the offset timestamp comprising an offset time of the detected event relative to a beginning of the video file. Thus, for each video file, the event engine 128 produces a set of offset timestamps for a set of detected events. In some embodiments, the set of offset timestamps may be used to independently identify and access the set of events in the video file (independent of the real timestamps found in the existing event metadata). In other embodiments, the event engine 128 may use the set of offset timestamps in conjunction with the real timestamps found in the existing event metadata to further process the events of the video file. In these embodiments, the event engine 128 may use the set of offset timestamps to time align the real timestamps and/or perform time adjustments to the real timestamps in the existing event metadata, as discussed further below.

To produce the automated process, the audio track of a video file is leveraged. For each event of interest, one or more audio criteria are determined that characterize and are associated with the event. The one or more audio criteria may be used to detect events in the audio track of the video file. The one or more audio criteria may be based on various audio attributes, such as amplitude, frequency, and the like. For example, for a pitch event, within the audio track there is a noticeable spike in sound-level amplitude from the crack of the bat when a pitch is hit, as well as when a ball hits the catcher's glove, both audio spikes indicating and characterizing a pitch event. For example, the one or more audio criteria for a pitch event may specify and require a minimum peak sound-level amplitude that is greater than two times the average amplitude of the previous three seconds of audio data to identify a pitch event. Thus, the one or more audio criteria for detecting an event (at a specific point in time of the audio track) may specify a minimum amplitude in comparison to amplitudes at other points in time of the audio track. In other embodiments, any other type of audio criterion may be used to detect/identify an event. For example, the one or more audio criteria may be based on amplitude and specify a minimum peak amplitude value to identify a relatively loud sound event. In another example, the one or more audio criteria may be based on amplitude and specify a maximum peak amplitude value to identify a relatively quiet sound event. In another example, the one or more audio criteria may be based on frequency, such as for detecting high pitched sound events that have a frequency above a minimum threshold frequency, or for detecting low pitched sound events that have a frequency below a maximum threshold frequency.

The event engine 128 then analyzes/scans an audio waveform of the audio track to determine if the one or more audio criteria are satisfied. If so, the event engine 128 determines that an event has occurred at the point in time the one or more audio criteria are satisfied within the audio track. The event engine 128 then logs the event with an offset timestamp indicating the offset time of the detected event relative to the beginning of the audio track and video file. Thus, for each video file, the event engine 128 produces a set of offset timestamps for a set of detected events.

Figure 3:
FIG. 3 illustrates how an audio waveform is analyzed in order to detect one or more events, according to one embodiment of the present invention.

FIG. 3 illustrates how an audio waveform is analyzed in order to detect one or more events, according to one embodiment of the present invention. In the example of FIG. 3, a sweep over a 2:15 long section of the audio track is performed to identify amplitude peaks greater than two times the average amplitude of the previous three seconds of audio data to identify pitch events. In the example of FIG. 3, the sweep of the audio track is performed at a resolution of 20 ms, whereby the audio track is processed in 20 ms segments, and the maximum amplitude is calculated over that period. In other embodiments, analysis of the audio track is performed at a different resolution. As shown in FIG. 3, several pitch events are detected comprising amplitude peaks identified as "pitch caught" and "pitch hit."

Figure 4:
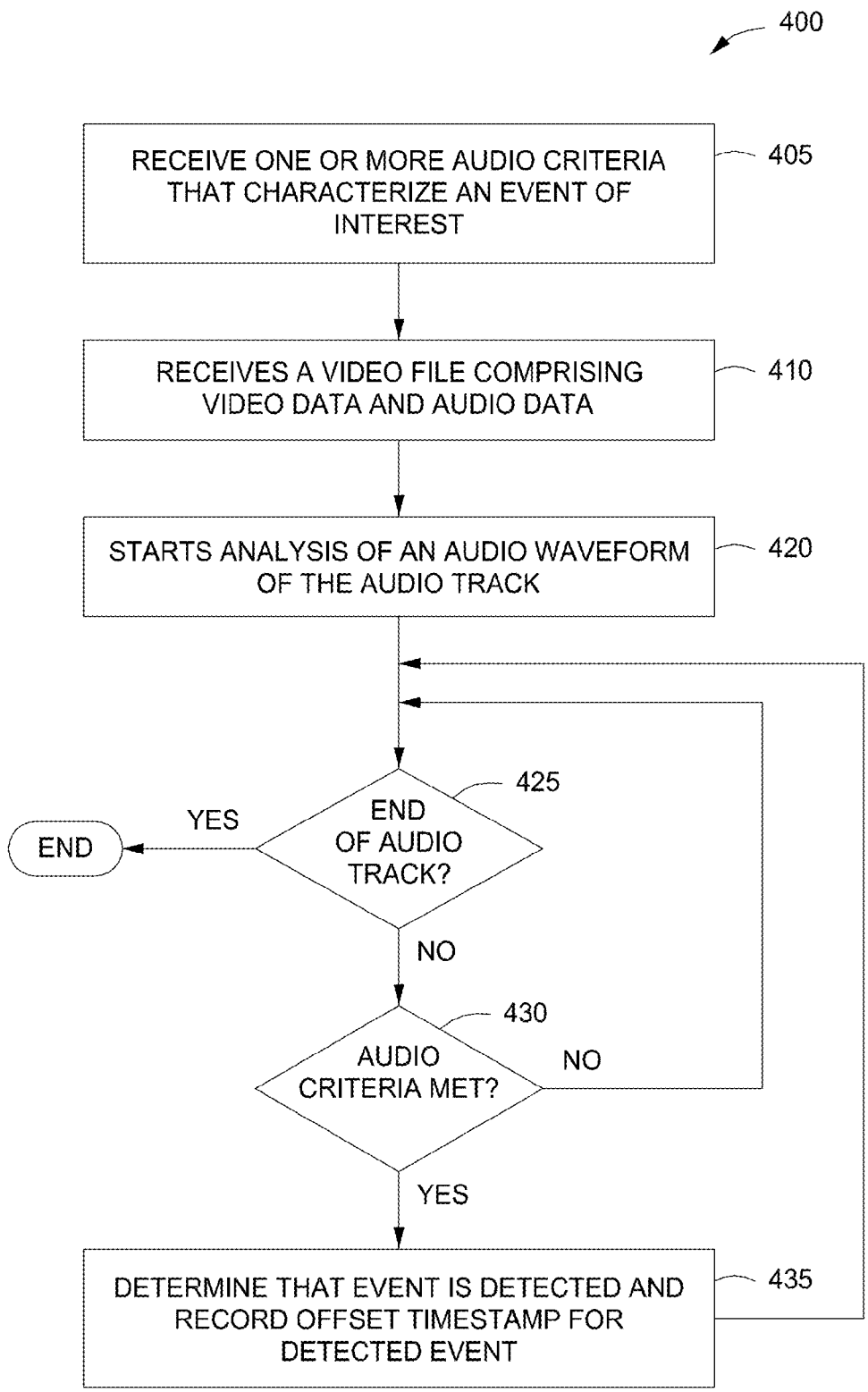
FIG. 4 illustrates a flow diagram of method steps for producing a set of detected events in a video file, according to one embodiment of the present invention.

FIG. 4 illustrates a flow diagram of method steps for producing a set of detected events in a video file, according to one embodiment of the present invention. Although the method steps are described in conjunction with the system of FIG. 1, persons skilled in the art will understand that any system configured to perform the method steps, in any order, is within the scope of the present invention.

As shown, a method 400 begins at step 405, where event engine 128, when executed by processing unit 122, receives one or more audio criteria that represent and characterize an event of interest. The event engine 128 also receives, at step 410, a video file comprising video data and audio data. The audio data comprises an audio track of the video file that is synchronized with the video data of the video file. At step 420, the event engine 128 starts analysis of an audio waveform of the audio track. At step 425, the event engine 128 determines if the end of the audio track is reached, and if so, the method 400 ends.

If the end of the audio track has not been reached, the event engine 128 determines, at step 430, if the one or more audio criteria has been satisfied/met at a current point in time of the audio track. If not, the event engine 128 continues to analyze the audio waveform at the next point in time of the audio track at step 425. If the event engine 128 determines, at step 430, that the one or more audio criteria has been satisfied/met at the current point in time in the audio track, the event engine 128 then determines, at step 435, that an event has been detected and occurs at the current point in time in the audio track. At step 435, the event engine 128 also logs/records an offset timestamp indicating the offset time of the detected event relative to the beginning of the audio track. The offset timestamp reflects the current point in time of the audio track where the event occurs and is detected. Note that since the audio track is synchronized with the video file, the recorded offset timestamp also indicates the offset time of the detected event relative to the beginning of the video file. The event engine 128 continues to analyze the audio waveform at the next point in time of the audio track at step 425. When the end of the audio track is reached, the event engine 128 has produced a set of offset timestamps for a set of detected events for the received video file.

As discussed above, the set of offset timestamps may be used to independently identify and access the set of events in the video file (independent of the real timestamps found in the existing event metadata). In other embodiments, the event engine 128 may use the set of offset timestamps in conjunction with the real timestamps found in the existing event metadata to further process the events of the video file.

Time Alignment of Event Metadata

In this section, the set of detected events having the set of offset timestamps (as produced by the method 400 of FIG. 4) are considered only to be a set of probable events. Thus, the set of detected events are not considered to be established or verified events, but only probable/likely events. This assumes that one or more detected events may not be actual events. In this section, for each video file, the set of detected events may be referred to as a set of probable events (having a set of offset timestamps), and the set of events specified in the existing event metadata 160 may be referred to as a set of established events (having a set of real timestamps).

The event engine 128 may use the set of detected probable events (produced by the method 400 of FIG. 4) to time align the set of established events with the beginning of the video file. This is done by using the set of detected events to help determine, in a computer-automated manner, the offset timestamp (referred to as the first offset timestamp) for the first established event relative to the beginning of the video file. The first established event in the video file is the earliest chronological established event in the video file. The first offset timestamp can then be used to determine the offset timestamps for all remaining established events in the video file. Thus, only the first offset timestamp of the first established event needs to be determined to time align the entire set of established events with the beginning of the video file.

Note that since the set of detected events (having the set of offset timestamps) is only considered a set of probable events, the first offset timestamp for the first established event cannot be determined by simply using the first offset timestamp for the first detected event, as the first detected event may or may not be an actual event. In some embodiments, the event engine 128 applies a fit function to the set of detected events and the set of established events to determine the first offset timestamp of the first established event, as discussed below.

The event engine 128 considers possible candidate values for the first offset timestamp ranging, for example, between 0 and 45 minutes, in steps of 1/24th of a second (equivalent to one video frame for a frame rate of 24 fps). At each candidate value for the first offset timestamp, the event engine 128 applies the fitness function to calculate how well the set of established events fits to the set of detected events. In other words, the fitness function calculates how well the set of real timestamps of the established events matches up with the set of offset timestamps of the set of detected events when the current candidate value is used as the first offset timestamp for the first established event. For each candidate value of the first offset timestamp, the fitness function produces a fitness value indicating the level of fitness/match between the set of established events and the set of detected events, a higher fitness value indicating a greater level of fitness/match. For example, a "match" may be determined to be found if the set of detected events contains a detected event within 0.5 seconds of an established event in the set of established event, and the fitness score may be incremented accordingly. Thus, the fitness score may indicate the number of detected events in the set of detected events that have a corresponding "matching" established event in the set of established events. After the fitness function has been applied for all candidate values in the range, the event engine 128 sets the candidate value having the highest fitness value as the first offset timestamp for the first established event.

Figure 5:
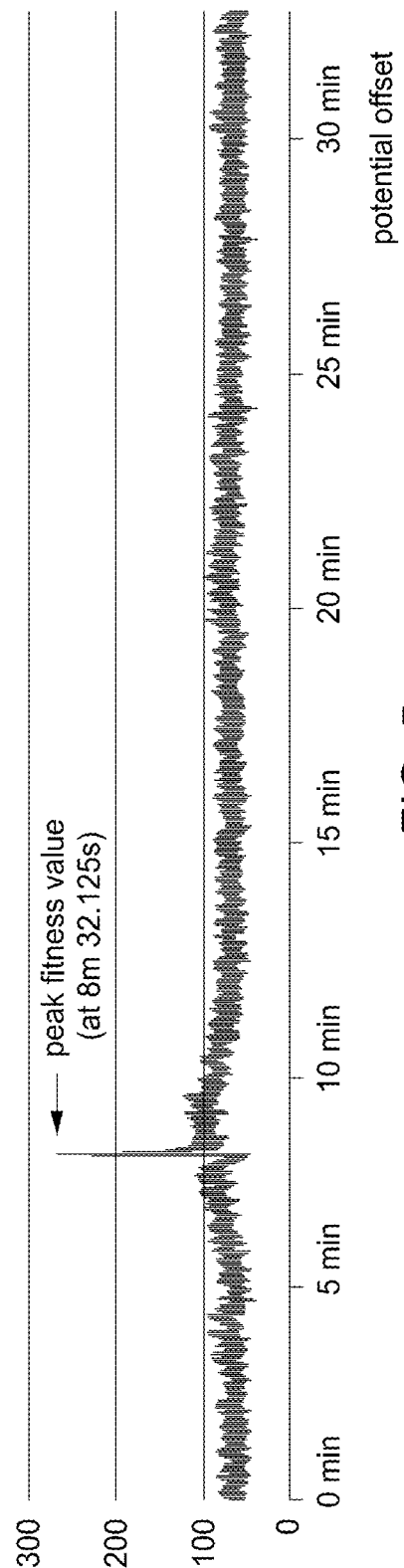
FIG. 5 shows a graph of fitness values produced for the set of detected events of FIG. 4, according to one embodiment of the present invention.

FIG. 5 shows a graph of fitness values produced for the set of detected events of FIG. 4, according to one embodiment of the present invention. The graph shows fitness values for a set of detected events and a set of established events over the course of a single game (single video file) over a range of candidate values for the first offset timestamp of the first established event. As shown in FIG. 5, the candidate value with the maximum fitness value is highlighted, which is set as the value of the first offset timestamp. This technique was shown to work to automatically align time all 29 video files with their corresponding sets of established events (as specified in the existing event metadata 160). The calculations took less than a second per video file on a workstation computer.

Figure 6:
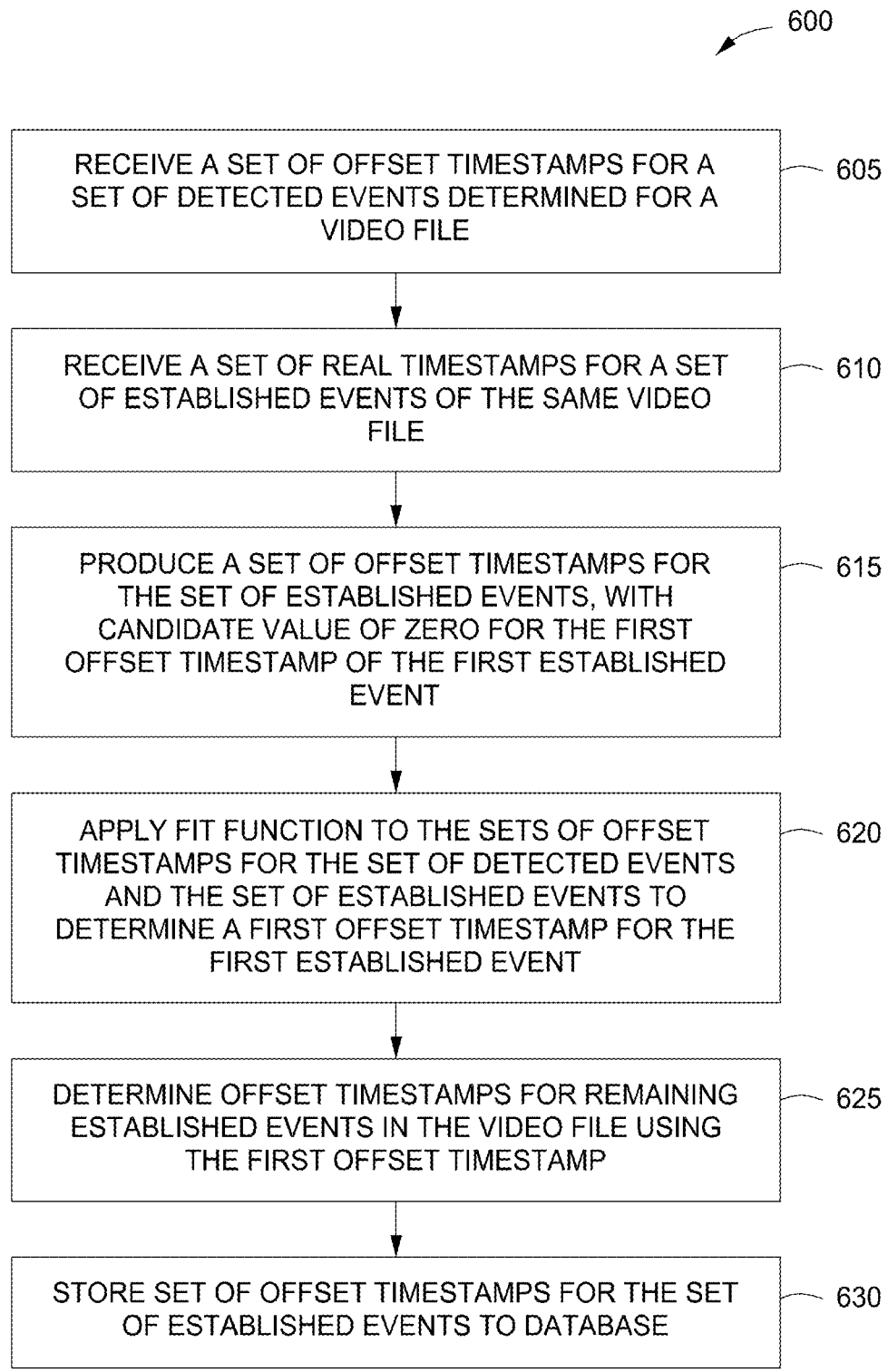
FIG. 6 is a flow diagram of method steps for time aligning a set of established events using the set of detected events of FIG. 4, according to one embodiment of the present invention.

FIG. 6 is a flow diagram of method steps for time aligning a set of established events using the set of detected events of FIG. 4, according to one embodiment of the present invention. Although the method steps are described in conjunction with the system of FIG. 1, persons skilled in the art will understand that any system configured to perform the method steps, in any order, is within the scope of the present invention.

As shown, a method 600 begins at step 605, where event engine 128, when executed by processing unit 122, receives a set of offset timestamps for a set of detected events determined for a video file. Note that since each offset timestamp indicates an offset time of a detected event relative to the beginning of the video file, the set of offset timestamps naturally comprises a timeline of detected events that is aligned with the beginning of the video file. The event engine 128 also receives, at step 610, a set of real timestamps for a set of established events of the same video file (e.g., as retrieved from the database 150 storing event metadata 160).

To properly compare the set of real timestamps with the set of offset timestamps, the event engine 128 produces, at step 615, a timeline of established events that is aligned with the beginning of the video file, wherein the first offset timestamp of the first established event is set to an initial candidate value of zero. Given the assumption that the first offset timestamp is zero, the offset timestamps for each of the remaining established events can then be determined by comparing the real timestamps of the first established event and the remaining established event. For example, for a second established event having a second real timestamp, a second offset timestamp for the second established event may be determined by calculating a time difference between the second and first real timestamps, the time difference comprising the second offset timestamp. For a third established event having a third real timestamp, a third offset timestamp for the third established event may be determined by calculating a time difference between the third and first real timestamps, the time difference comprising the third offset timestamp, and so forth for each established event. The timeline of the set of established events that is aligned with the beginning of the video file comprises a set of offset timestamps for the set of established events, with a default candidate value of zero set for the first offset timestamp of the first established event.

The event engine 128 then applies, at step 620, a fit function to the sets of offset timestamps for the set of detected events and the set of established events to determine a first offset timestamp for the first established event. The event engine 128 applies the fit function through a range of possible candidate values for the first offset timestamp from 0 to X minutes (e.g., 0 to 45 minutes). The fit function may be performed in a plurality of iterations, each iteration increasing the candidate value by a predetermined time increment (e.g., 1/24th of a second). At each iteration, the fitness function calculates a fitness value for the current candidate value, the fitness value indicating the level of fitness/match between the sets of offset timestamps for the set of detected events and the set of established events given the current candidate value for the first offset timestamp for the first established event. A higher fitness value indicates a greater level of fitness/match. The candidate value producing the highest fitness value is then set as the value for the first offset timestamp for the first established event.

The event engine 128 then determines, at step 625, the offset timestamps for all remaining established events in the video file using the first offset timestamp for the first established event. The set of offset timestamps for the set of established events for the video file is then stored, at step 630, to the database 150. For example, the set of offset timestamps for the set of established events may be stored as new entries in the database 150, or the corresponding metadata entries for the established events in the event metadata 160 may be updated in the database 150 to reflect the determined offset timestamps. The method 600 then ends. By determining the offset timestamps for the set of established events in the video file, each event may now be rapidly located and retrieved within the video file for playback.

Time Adjustments of Event Metadata

Once the set of offset timestamps for the set of established events in the video file has been determined (using the method 600 of FIG. 6), the set of offset timestamps for the set of detected events in the video file (produced by the method 400 of FIG. 4) may then be used to perform time adjustments of the offset timestamps for the set of established events and/or the real timestamps for the set of established events stored in the event metadata 160.

Note that once the set of offset timestamps for the set of established events is established, it can be compared to the set of offset timestamps for the set of detected events, where each established event has a corresponding detected event in close time proximity. Typically, the offset timestamp of the corresponding detected event does not exactly match the offset timestamp of the established event and is either slightly earlier or slightly later (in fractions of a second) than the offset timestamp of the established event. In some embodiments, these differences in the offset timestamps may be used to adjust the offset timestamps for the set of established events and/or the real timestamps for the set of established events stored in the event metadata 160.

Typically, the real timestamps of established events in the event metadata 160 is produced by rounding the real timestamps to the nearest second. Since the real timestamps of established events is rounded to the nearest second, the resulting offset timestamps of established events is also rounded to the nearest second, and thus is not as accurate as could be. In casual viewing situations a user could start playback 2 or 3 seconds before an actual pitch event to ensure the pitch is seen. However, as one of the goals is to watch as many events as possible in the shortest amount of time, a more accurate solution is needed.

In some embodiments, an offset timestamp for a detected event (as determined in the method 400 of FIG. 4) has a higher level of time accuracy (higher time resolution) than the real and/or offset timestamp for an established event. In these embodiments, the real and/or offset timestamps for an established event has a first level of time accuracy (first level of time resolution), and the offset timestamp for a corresponding detected event has a second level of time accuracy (second level of time resolution), the second level being higher than the first level. The real and/or offset timestamp for an established event is adjusted (increased or decreased) based on the offset timestamp for a corresponding detected event, which is assumed to be more accurate. For example, if the offset timestamp for an established pitch event is 38 seconds after the beginning of the video file, but the offset timestamp for the corresponding detected pitch event is 38.375 seconds after the beginning of the video file, the offset timestamp for the established pitch event may be adjusted +0.375 seconds to 38.375 seconds.

Figure 7:
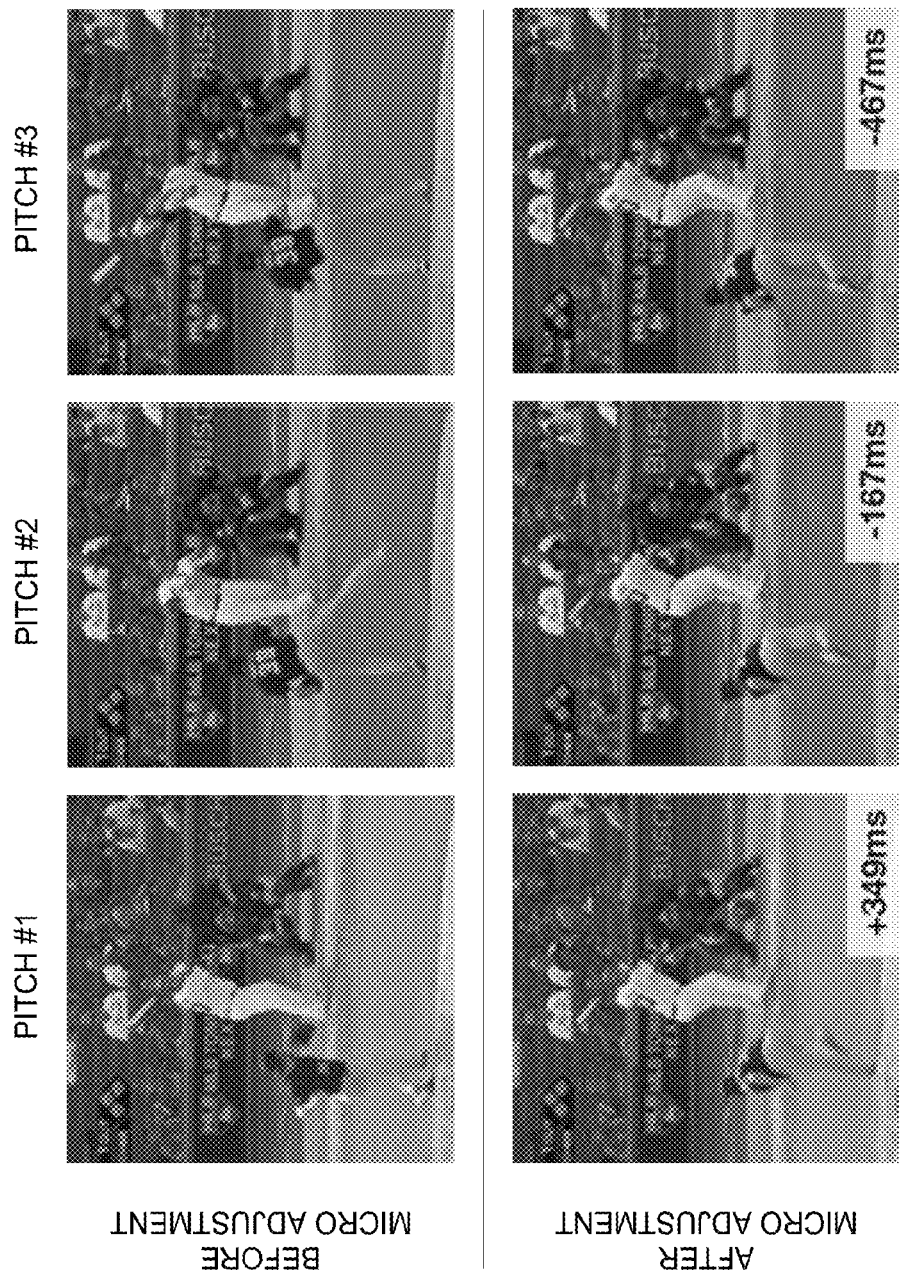
FIG. 7 shows video frames of three pitch events that have been time adjusted, according to one embodiment of the present invention.

FIG. 7 shows video frames of three pitch events that have been time adjusted, according to one embodiment of the present invention. Each video frame is 0.5 seconds into playback of the event using a one second auto-advance mode for the three pitch events before and after the time adjustment. When using the one second auto-advance mode, the playback of each event begins 0.7 seconds before the pitch event and continues for 0.3 seconds afterwards. Note the varied position of the pitcher and batter in the before-adjustment row of video frames, and the consistent positions of the pitcher and batter in the after-adjustment row of video frames. The time adjustments (time increase or decrease) is also shown in FIG. 7 (e.g., +349 ms, −167 ms, −467 ms). This technique was able to successfully find a corresponding detected event for each established time event within a predetermined time window (predetermined time proximity) and apply the timing micro adjustment to 94% of the pitch events in the database.

Figure 8:
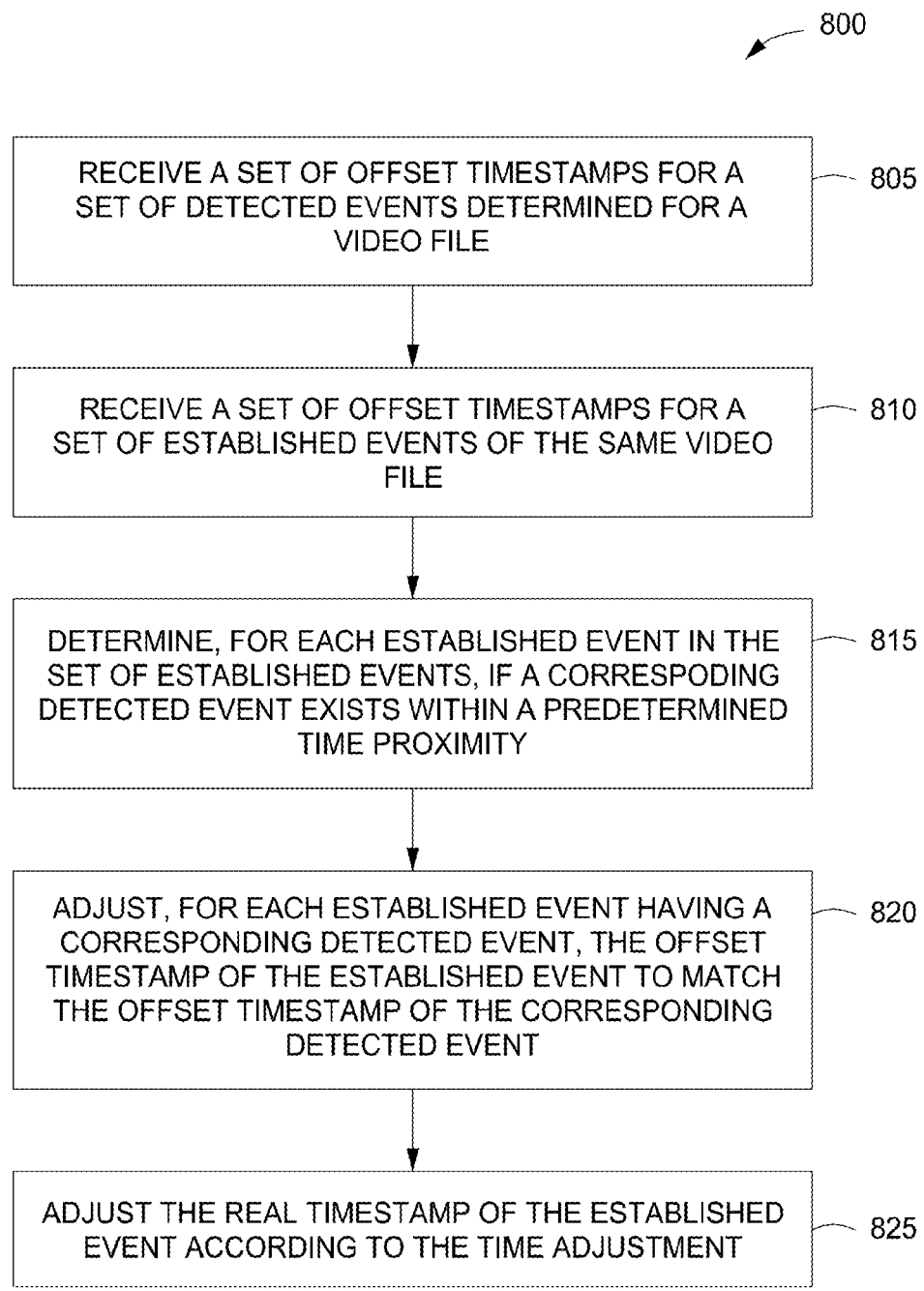
FIG. 8 is a flow diagram of method steps for time adjusting the set of offset timestamps for the set of established events of FIG. 6, according to one embodiment of the present invention.

FIG. 8 is a flow diagram of method steps for time adjusting the set of offset timestamps for the set of established events of FIG. 6, according to one embodiment of the present invention. Although the method steps are described in conjunction with the system of FIG. 1, persons skilled in the art will understand that any system configured to perform the method steps, in any order, is within the scope of the present invention.

As shown, a method 800 begins at step 805, where event engine 128, when executed by processing unit 122, receives a set of offset timestamps for a set of detected events determined for a video file. The event engine 128 also receives, at step 810, a set of offset timestamps for a set of established events of the same video file (e.g., as retrieved from the database 150 storing event metadata 160).

For each established event in the set of established events, the event engine 128 then determines, at step 815, if a corresponding detected event exists in the set of detected events that is within a predetermined time window/proximity of the established event (e.g., within a time proximity of 0.4 seconds). This may be determined by comparing the offset timestamp of each established event with the set of offset timestamps for the set of detected events to determine if any offset timestamps for the set of detected events is within the predetermined time window/proximity of the offset timestamp of the established event.

For each established event determined to have a corresponding detected event, the event engine 128 adjusts, at step 820, the offset timestamp of the established event to match the offset timestamp of the corresponding detected event. The time adjustment may comprise a negative or positive adjustment, and may comprise a time adjustment that is a fraction of a second. The time adjustment may update the offset timestamp for the established event in the database 150. The event engine 128 also adjusts, at step 825, the real timestamp of the established event in the event metadata 160 stored on the database 150 according to the time adjustment. For example, a "time-adjustment" column may be added to the event metadata 160 in the database 150 to store the time adjustment. The method 800 then ends. By time adjusting timestamps of events of a video file to reflect a more accurate timestamp, the events may be retrieved and played back at a greater rate with increased accuracy.

User Interface for Searching and Playing Events

Some embodiments are directed towards techniques that allow users to search, browse, and/or play through events of interest in a collection of video files 155 based on event metadata 160 stored on the database 150. The techniques allow a user to execute complex queries across the event metadata 160 and view the event results in video form. The framework allows users to quickly find relevant events within the video files and play them back in rapid succession. The framework exposes as many unique attributes of the event metadata 160 as possible, employing highly responsive and interactive metadata controls. The framework allows visualization of the attributes and attribute values meant to aid in the workflow of selecting a set of events to watch. Also, playback of the requested events should be both immediate to start, and then advance quickly through the events, where only the relevant parts of an event should be played. This allows for a user to watch as many relevant events as possible in the shortest amount of time.

A UI engine 130 provides a user interface (UI) that allows users to visualize and interactively explore the events of video files 155 and associated event metadata 160 stored on the database 150. An end-user uses the UI engine 130 to submit queries to search and browse events of interest from video files 155 and receive fast playback of the requested events. The UI engine 130 may reside on the server machine 120 or on a remote client machine 110 that accesses the database 150 via network 140. The individual UI tools and elements are linked and highly interactive, supporting a faceted search paradigm and encouraging exploration of the event metadata 160. Besides being useful for purposeful, directed tasks, the UI also encourages freeform exploration through the use of highly-interactive controls and immediate viewing of results. In some embodiments, large portions of the event metadata 160 stored on the database 150 may be uploaded and stored to memory (such as memory unit 103 on client machine 110 or memory unit 126 on server machine 120) to provide faster response to metadata queries.

Figure 9:
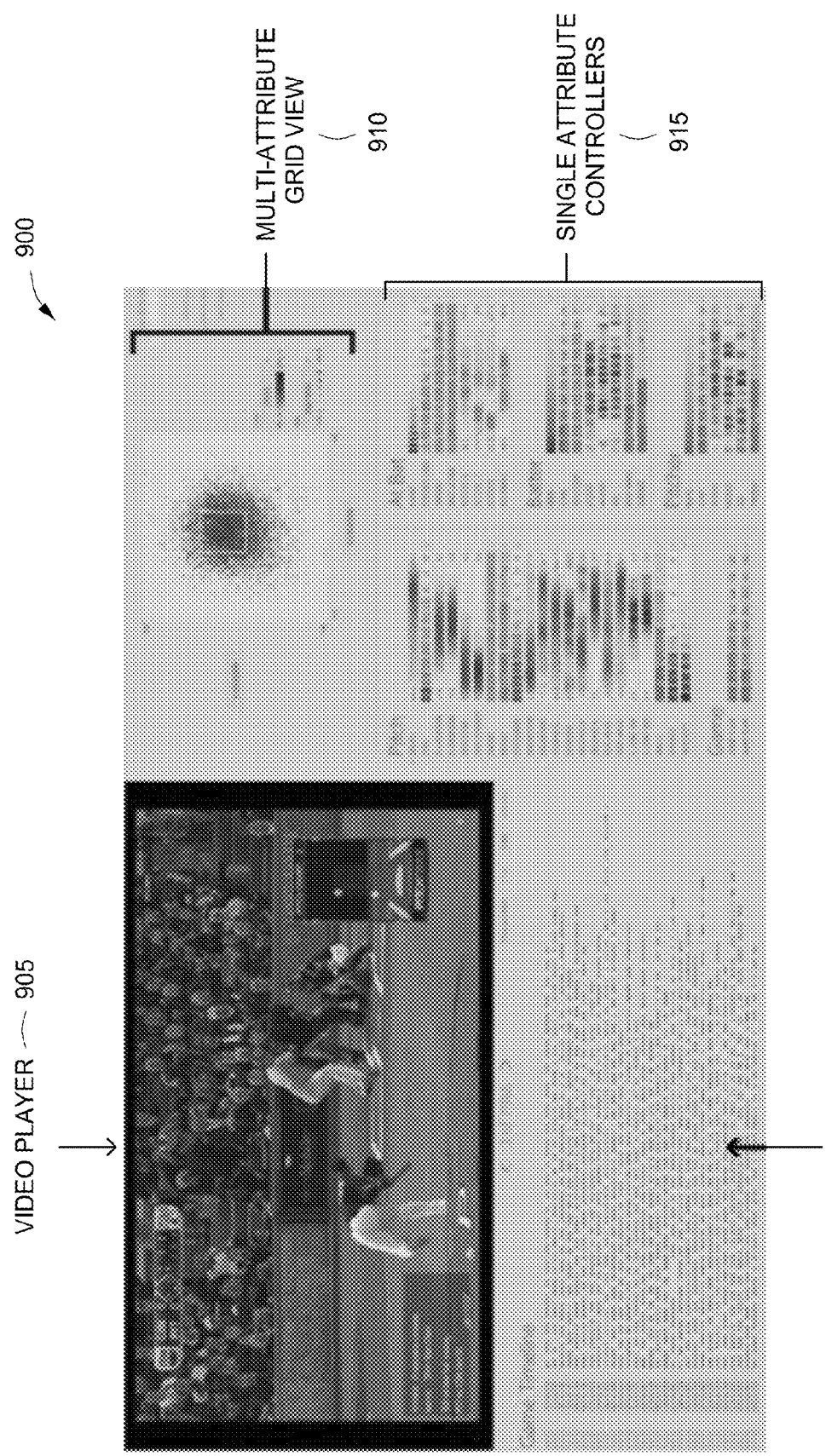
FIG. 9 shows a screenshot of a user interface (UI) for searching and playing events of video files using event metadata, according to one embodiment of the present invention.

FIG. 9 shows a screenshot of a user interface (UI) 900 for searching and playing events of video files using event metadata, according to one embodiment of the present invention. As shown in FIG. 9, the UI 900 is comprised of four main components/elements: a video player 905, video timelines 920, single-attribute controllers 915, and a multi-attribute grid view 910. The video player 905 displays playback of events of video files and supports rapid playback of query results. The video timelines 920 show each individual video file in the library with its associated event locations (e.g., where one line visually represents one video file and one dot visually represents one event). The single-attribute controllers 915 provide support for faceted search and the multi-attribute grid view 910 provides a two-dimensional visual display of the current requested event metadata set for a user-specified set of attributes (as specified by the single-attribute controllers 915).

The UI elements are tightly linked to each other so that hovering over events in one view highlights them in the other views, and selections in one view are immediately represented in the others. In some embodiments, to treat events as the primary entity, a constant mapping of "1 dot=1 event" is followed. That is, a single dot in any of the UI elements represents a single event. Additionally, a red dot is universally used to highlight the event currently being played.

Single-Attribute Controllers

As discussed above, each event has corresponding event metadata that describes the particular event in terms of attributes and corresponding attribute values. For example, a pitch event may be described in terms of attributes such as speed and pitch type. Attributes may be classified as discreet or continuous. Discreet attributes have a finite number of possible values, while continuous attributes can have any value between a maximum and minimum value. If the discreet values are numerical, the attribute is considered to be ordered discreet, otherwise it is unordered discreet. These attributes may form the basis of how specific events within a video file are selected for playback, and how the events are visually represented through a user interface.

An attribute from the event metadata is represented by a single-attribute controller (SAC). FIG. 10 shows a screenshot of two single-attribute controllers 1005 and 1010 shown in the user interface 900 of FIG. 9, according to one embodiment of the present invention. As shown in FIG. 10, each SAC 1005 and 1010 comprises an attribute label 1015 and a value strip 1020. Each SAC has a relatively short height (20 pixels) to allow for many to be stacked vertically on the display and help maximize information density. Each SAC has a label with the attribute's name on the left, and a value strip showing the attribute values (discreet or continuous) on the right.

In the value strip 1020, each event is represented by one point. To improve legibility, the opacity of each dot is dynamically lowered as the number of data points increases. The horizontal position of each point is based on the value of the attribute/variable for each event. For continuous variables the horizontal position is based on the value's relative position between the minimum and maximum values of the attribute, and for discreet variables, the value strip is divided into discreet buckets, with the point placed randomly within the width of the proper bucket. With ordered discreet variables the buckets are sorted numerically, while unordered discreet variables are sorted from highest to lowest by the number of events in each category.

FIG. 11 shows a screenshot of a hovering feature of the SACs shown in FIG. 9, according to one embodiment of the present invention. As shown in FIG. 11, a collection of SACs are shown before and during a hover operation. As a cursor moves over a value strip, the events at the cursor position are placed into a "hovered" state. For discreet variables, all events within the same bucket as the cursor are considered hovered. While the cursor is moving over one SAC, the value strips on all other SACs are faded, and the hovered events are highlighted. This "linking" behavior between multiple plots is typically done in combination with "brushing" or selecting data in one data view, and then applying the highlighting effect to the selected points in the other views. The real-time hover based approach can expose the user to interactions between the attributes that they may not have even been looking for, thereby encouraging exploration of the dataset.

Figure 12:
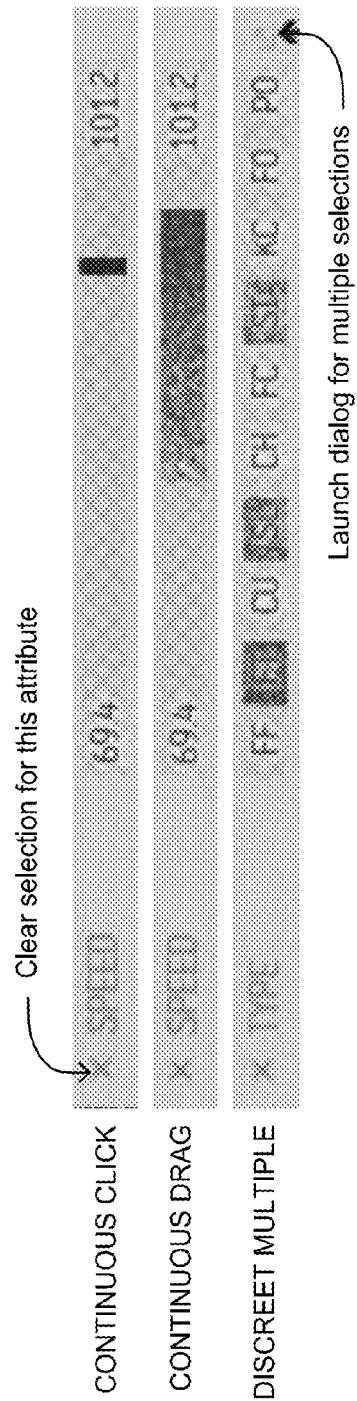
FIG. 12 shows a screenshot of a filtering feature of the SACs shown in FIG. 9, according to one embodiment of the present invention.

FIG. 12 shows a screenshot of a filtering feature of the SACs shown in FIG. 9, according to one embodiment of the present invention. FIG. 12 shows example selections made in continuous and discreet SACs. Filtering the events based on a single attribute is primarily accomplished through clicking or dragging within the value strip. In a continuous SAC, clicking selects a very narrow slice of the data range (FIG. 12, top), and click-dragging selects a broader region (FIG. 12, middle). In a discreet SAC, clicking selects all the points in a discreet bucket, and dragging in discreet SACs is only supported when the data is ordered. Discreet attributes have an icon to the right of the value track which launches a dialog allowing for multiple selections (FIG. 12, bottom). Once a selection has been made in a SAC, the areas which have been filtered out are indicated with a hatched background pattern. Additionally, a "clear" icon appears to the left of the attribute label to clear the selection from this attribute.

Figure 13:
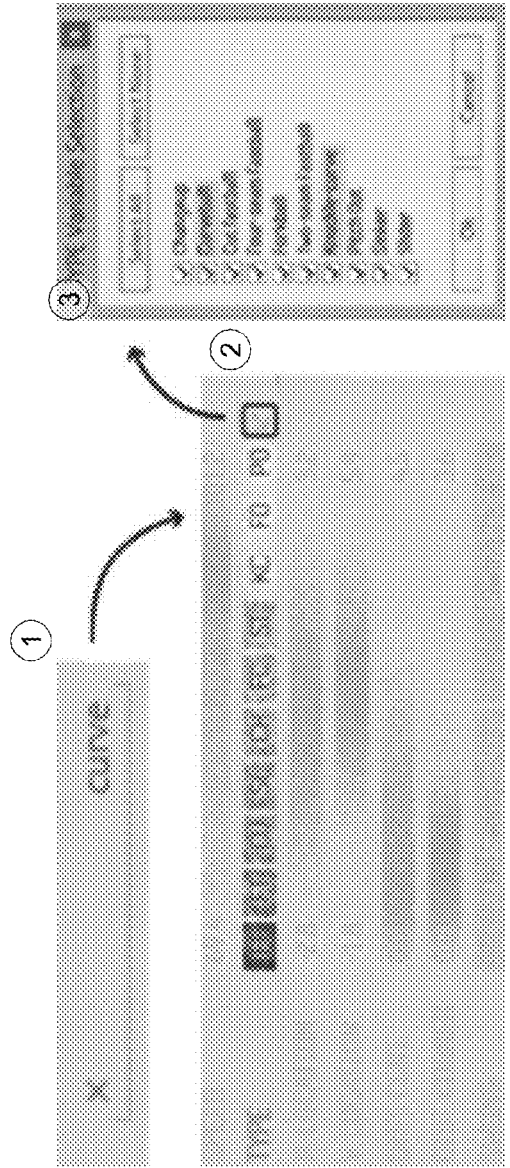
FIG. 13 shows screenshots of a search and highlight feature of the SACs shown in FIG. 9, according to one embodiment of the present invention.

FIG. 13 shows screenshots of a search and highlight feature of the SACs shown in FIG. 9, according to one embodiment of the present invention. FIG. 13 shows a workflow of the search/highlight feature. As the framework supports and encourages the inclusion of many attributes, finding a particular event type may be difficult. A real-time search field allows for searching within the attribute names, tooltips, and discreet value labels. As text is entered in the search box, the label or "launch selection dialog" button for any matching SAC is highlighted as are any matching entries in the variable selection dialog.

Multi-Attribute Grid View

Figure 14:
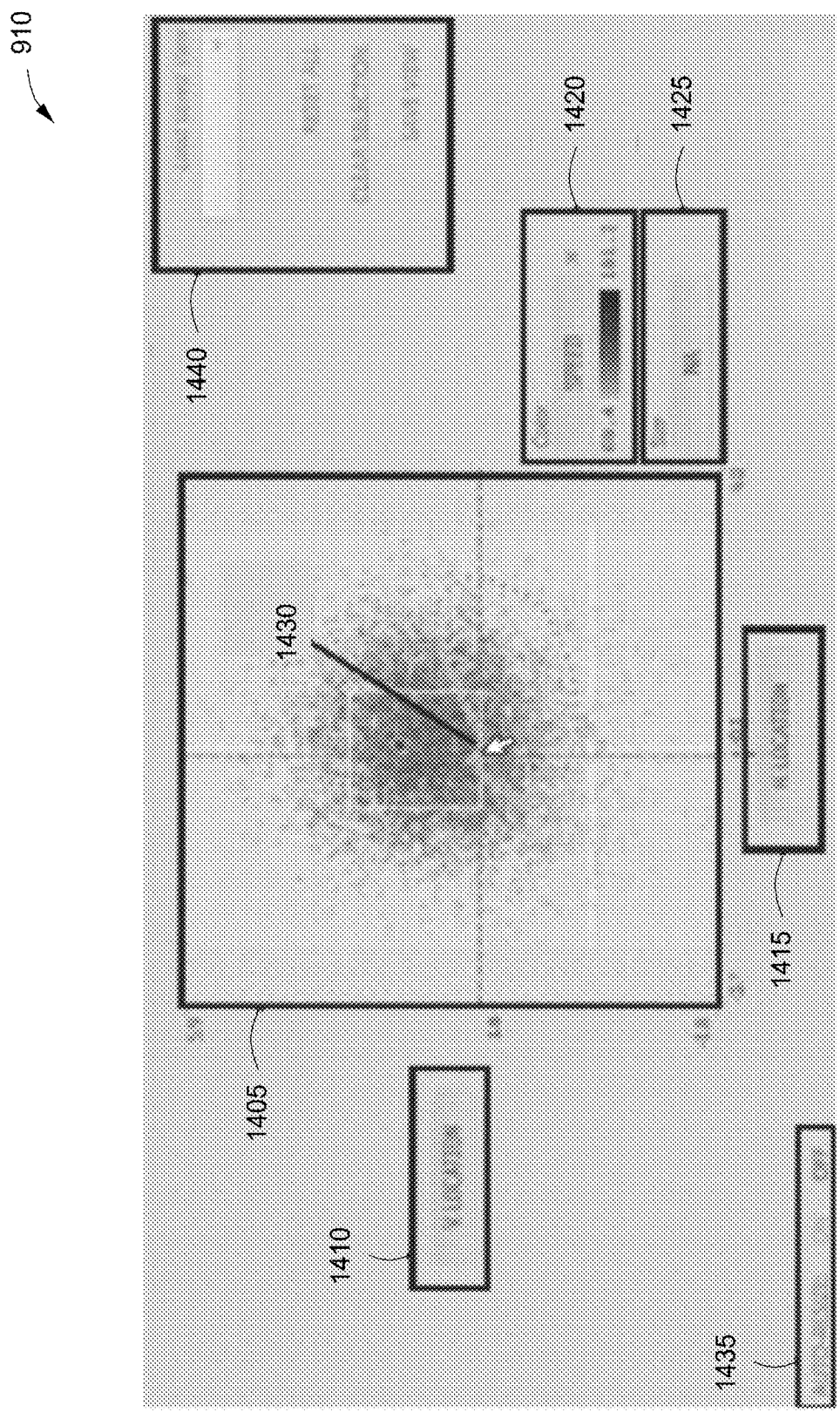
FIG. 14 shows a screenshot of the multi-attribute grid view (MAG) shown in FIG. 9, according to one embodiment of the present invention.

FIG. 14 shows a screenshot of the multi-attribute grid view (MAG) 910 shown in FIG. 9, according to one embodiment of the present invention. The main area of the MAG is a two-dimensional grid 1405 with an attribute mapped to each of the horizontal and vertical axes. Within the grid are points mapped to each of the events in the active collection 1410 and 1415. Besides the horizontal and vertical axes, attributes can also be mapped to the color and size of the individual points 1420 and 1425. These mappings are set by dragging an attribute label from a Single Attribute Controller onto one of the four variable dimensions on the Multi Attribute Grid (horizontal axis, vertical axis, color, size). The simple interaction of dragging SAC labels onto dimensions of the MAG encourages exploration of the data. The MAG also contains controls to clear the current selection, reset the application state, and to save/load specific views 1440.

Figure 15:
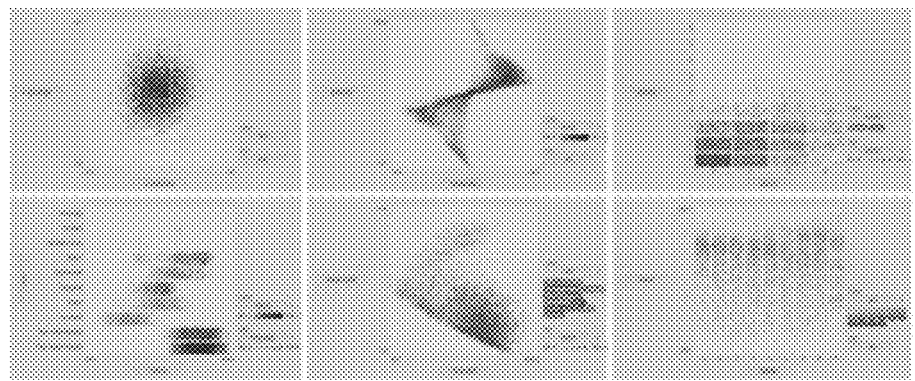
FIG. 15 shows examples of the Multi-Attribute Grid of FIG. 14 with different combinations of attributes mapped to the dimensions, according to one embodiment of the present invention.

FIG. 15 shows examples of the Multi-Attribute Grid of FIG. 14 with different combinations of attributes mapped to the dimensions, according to one embodiment of the present invention. For continuous attributes the grid is scaled so the minimum and maximum values span the entire length of the axis. When one axis is mapped to a discreet variable, the axis is split into a set of groups with a small gap between categories (FIG. 15, bottom left, bottom right). With both axes mapped to discreet variables, the plot is divided into a number of equal sized cells (FIG. 15, top right). Within the grid, events are selected with a lasso (1430 of FIG. 14). As with the SACs, while hovering the cursor over the MAG, the events under the area around the cursor are highlighted in the other event visualizing UI components.

The color dimension accepts any facet type, and colors each dot using a coloring scheme based on the variable type. When a discreet variable is used for the color dimensions, small 'pill' buttons show only the values of the attribute which are present in the currently set of events. Hovering over an individual value highlights those events in the grid (and other UI components), and clicking on one filters the selection down to only those matching events. The size dimension is only available for continuous variables. Color and Size dimension appearances for each of the attribute variable types.

Video Timelines

Figure 16:
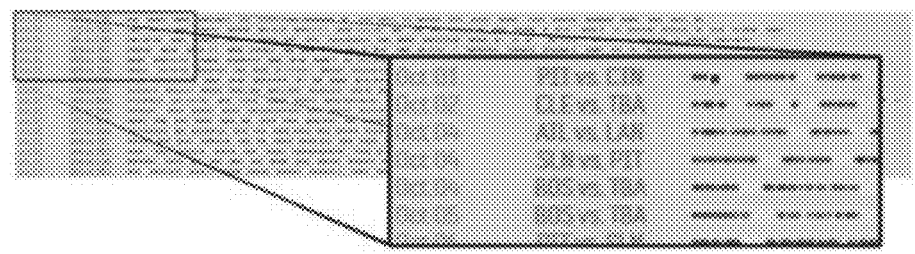
FIG. 16 shows a section of the video timelines of FIG. 9, according to one embodiment of the present invention.

The UI 900 also includes a video timeline 920 component. FIG. 16 shows a section of the video timelines 920 of FIG. 9, according to one embodiment of the present invention. The red dot highlights the event which is currently being played. There is one timeline for each video file (e.g., baseball game) in the collection. The events are placed along the timeline based on their timestamp. A scroll bar is used if there are more videos in the collection than can fit on the screen. Hovering, clicking, and dragging operations on the timeline work much the same way as they do for the SACs; they highlight and select a set of events. Clicking on the video description label selects all events in the video, and an 'x' icon clears the selection made in the video timeline.

Example Case

Events of Baseball Games

In an example, the UI 900 is used to search and display events of video files comprising baseball games, each video file comprising a single baseball game having a plurality of events (e.g., pitch events). Baseball was chosen as a target domain due to the large amounts of baseball video produced each year and the depth of event metadata which has become available for these games in recent years. To demonstrate several ways in which the UI 900 can be used, a walkthrough of how to complete three representative tasks is provided.

Figure 17:
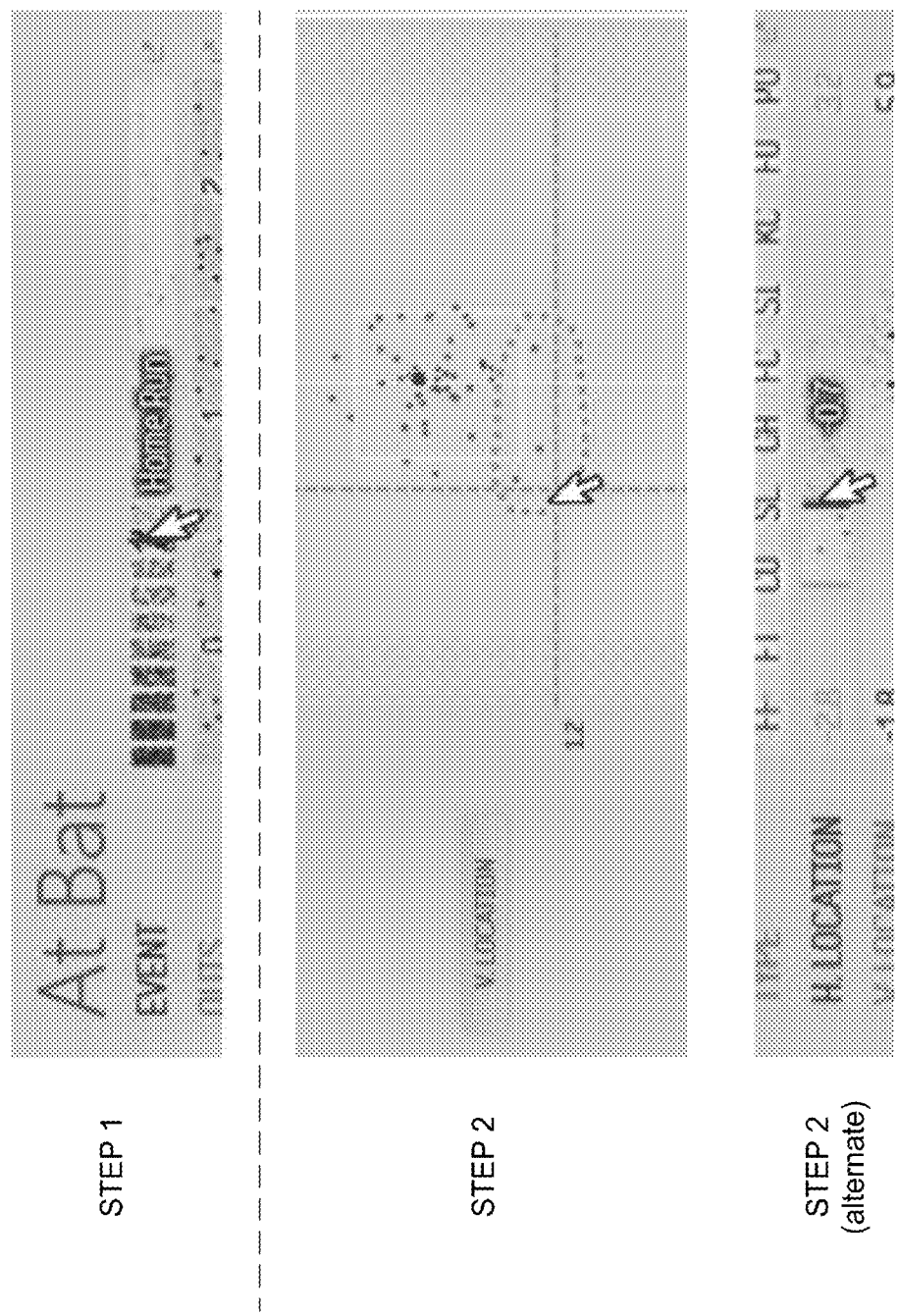
FIG. 17 shows a walkthrough of a first task comprising watching the lowest pitches hit for a homerun using the UI of FIG. 9, according to one embodiment of the present invention.

FIG. 17 shows a walkthrough of a first task comprising watching the lowest pitches hit for a homerun using the UI 900 of FIG. 9, according to one embodiment of the present invention. First, the user filters the "at bat event type" to only show the homeruns (Step 1). Then the user makes a lasso selection around the lowest points in the Multi-Attribute Grid (Step 2), which is by default mapped to the horizontal and vertical location of the pitch. Alternatively, the user could select the lowest values in the "V. Location" single-attribute controller (Step 2 alternate). The three homerun clips immediately play in the video player.

Figure 18:
FIG. 18 shows a walkthrough of a second task comprising watching all strikeouts in a particular game using the UI of FIG. 9, according to one embodiment of the present invention.

FIG. 18 shows a walkthrough of a second task comprising watching all strikeouts in a particular game using the UI 900 of FIG. 9, according to one embodiment of the present invention. The user could first click on the video timeline label for the particular game (Step 1). At this point the video player displays all pitches from this game, and using the variable timing auto-advance mode, would give the viewer a quick way to watch the recap of an entire game. To watch only the strikeouts, the user would filter the "at bat event type" to show only strikeouts (Step 2). Due to the faceted nature of the filtering interface, these two steps could be done in either order.

Figure 19:
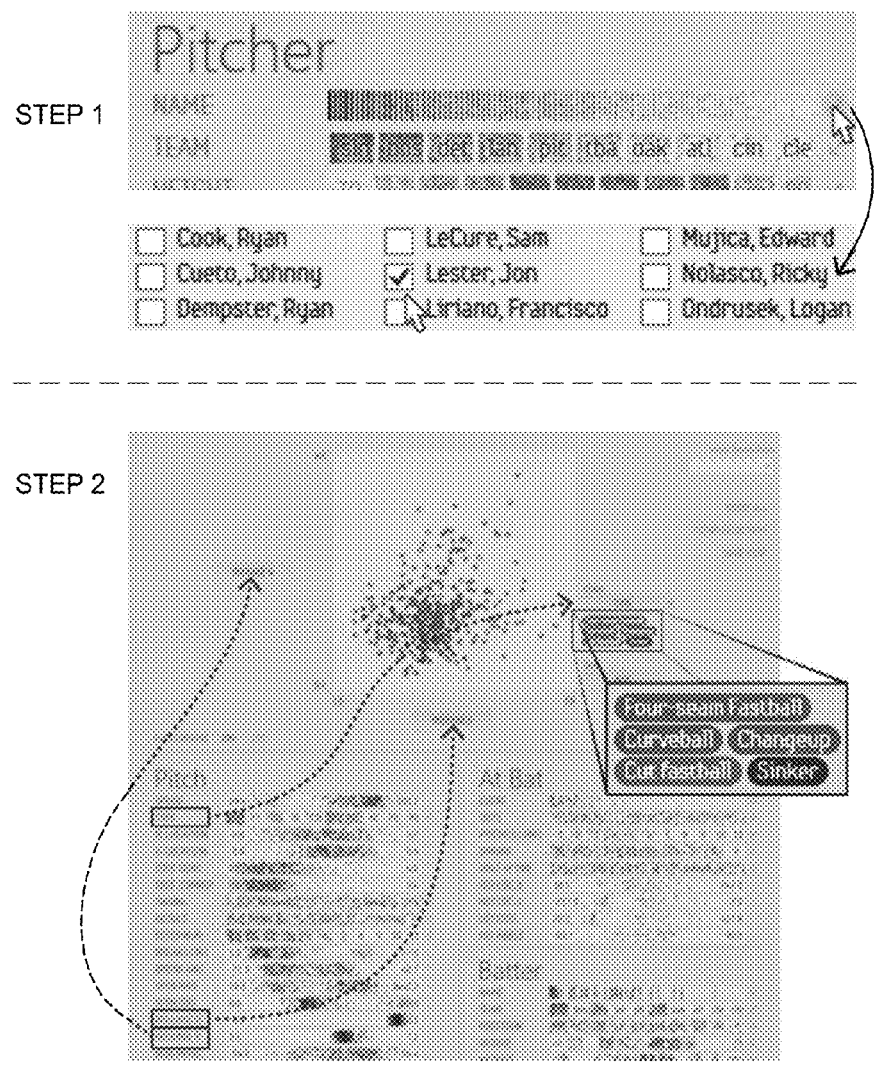
FIG. 19 shows a walkthrough of a third task comprising analyzing the pitches of a particular pitcher using the UI of FIG. 9, according to one embodiment of the present invention.

FIG. 19 shows a walkthrough of a third task comprising analyzing the pitches of a particular pitcher using the UI 900 of FIG. 9, according to one embodiment of the present invention. For example, the third task may comprise analyze the release points of the particular pitcher. The first step is to filter the "pitcher name" attribute to select the particular pitcher (Step 1). Then, we drag the "Release H." and "Release V." attributes, representing the horizontal and vertical position of the ball as it leaves the pitcher's hand, up to the MAG. At this point we see the location where all of the pitches were released. To look for patterns, we drag the "pitch type" attribute to the color dimension (Step 2). Now we can see that the pitcher releases his curveballs from a higher position than his other pitches. This information can increase the batters chance of getting a hit. At this point the clips of all the pitcher's pitches are playing, so we can watch the video and verify these visual tells.

In sum, a computing device (such as event engine 128 on a server machine 120) is configured to process a video file. The video file comprises an audio track and contains at least one event comprising a scene of interest. One or more audio criteria that characterize the event are used to detect events using the audio track. For each detected event, an offset timestamp is recorded for the event. The offset timestamp indicates a time offset where the event is detected relative to a beginning of the video file. A set of offset timestamps may be produced for a set of detected events of the video file. The set of offset timestamps for the set of detected events may be used to time align a plurality of real timestamps for a plurality of established events for the same video file with the beginning of the video file. Time aligning the plurality of real timestamps for a plurality of established events includes determining an offset timestamp for the first established event in the plurality of established events. The set of offset timestamps for the set of detected events may be used to time adjust a plurality of real timestamps for a plurality of established events for the same video file. Time adjusting includes determining a corresponding detected event for each established event, and adjusting a real timestamp for each established event based on the offset timestamp of the corresponding detected event. In other embodiments, a computing device (such as UI engine 130 on a client machine 110 or server machine 120) is configured to quickly and easily search, browse, and playback events of interest across multiple video files.

An advantage of the disclosed technique is that events of interest in a video file may be efficiently detected and logged in a computer-automated manner. Further, existing event metadata 160 may be time aligned and time adjusted using the detected events in an efficient and computer-automated manner to provide more accurate timestamps for events. Also, a UI is provided that allows quick and easy search and playback of events of interest across multiple video files.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for detecting events in a video file, the method comprising:
   receiving one or more audio criteria that characterize a scene of interest in the video file, wherein the video file includes an audio track;
   determining that an event is detected at a first point in time associated with the audio track upon determining that the one or more audio criteria are satisfied at the first point in time; and
   recording an offset timestamp for the event that indicates an amount of time that has elapsed between the beginning of the video file and the first point in time.

2. The computer-implemented method of claim 1, wherein the one or more audio criteria specify a minimum sound-level amplitude for detecting an event.

3. The computer-implemented method of claim 1, wherein the scene of interest relates to displayed content of the video file that is of interest to a user, the scene of interest spanning one or more video frames in the video file.

4. The computer-implemented method of claim 1, further comprising:
   determining that a plurality of events are detected at a plurality of points in time associated with the audio track upon determining that the one or more audio criteria are satisfied at the plurality of points in time; and
   recording a plurality of offset timestamps for the plurality of detected events of the video file.

5. The computer-implemented method of claim 4, further comprising:
   time aligning a plurality of real timestamps for a plurality of established events for the video file with the beginning of the video file based on the plurality of offset timestamps for the plurality of detected events.

6. The computer-implemented method of claim 5, wherein:
   a real timestamp for an established event does not indicate a time offset of the established event relative to the beginning of the video file; and
   time aligning the plurality of real timestamps further comprises determining a first offset timestamp for a first established event in the plurality of established events.

7. The computer-implemented method of claim 6, wherein time aligning the plurality of real timestamps further comprises applying a fit function to the plurality of real timestamps and to the plurality of detected events to determine a value for the first offset timestamp.

8. The computer-implemented method of claim 6, further comprising:
determining a plurality of offset timestamps for the plurality of established events using the first offset timestamp; and
time adjusting the plurality of offset timestamps for the plurality of established events using the plurality of offset timestamps for the plurality of detected events.

9. The computer-implemented method of claim 8, wherein time adjusting comprises:
for at least one established event in the plurality of established events, determining a corresponding detected event in the plurality of detected events; and
adjusting the offset timestamp for the at least one established event based on the offset timestamp of the corresponding detected event.

10. A non-transitory computer-readable medium storing program instructions that, when executed by a processor cause the processor to detect events in a video file by performing the steps of:
receiving one or more audio criteria that characterize a scene of interest in the video file, wherein the video file includes an audio track;
determining that an event is detected at a first point in time associated with the audio track upon determining that the one or more audio criteria are satisfied at the first point in time; and
recording an offset timestamp for the event that indicates an amount of time that has elapsed between the beginning of the video file and the first point in time.

11. The non-transitory computer-readable medium of claim 10, wherein the one or more audio criteria specify a minimum amplitude in comparison to amplitudes at other points in time of the audio track.

12. The non-transitory computer-readable medium of claim 10, further comprising the steps of:
determining that a plurality of events are detected at a plurality of points in time associated with the audio track upon determining that the one or more audio criteria are satisfied at the plurality of points in time; and
recording a plurality of offset timestamps for the plurality of detected events of the video file.

13. The non-transitory computer-readable medium of claim 12, further comprising the steps of:
time aligning a plurality of real timestamps for a plurality of established events for the video file with the beginning of the video file based on the plurality of offset timestamps for the plurality of detected events.

14. The non-transitory computer-readable medium of claim 13, wherein:
a real timestamp for an established event indicates an actual time that the established event occurred; and
time aligning the plurality of real timestamps further comprises determining a first offset timestamp for a first established event in the plurality of established events.

15. The non-transitory computer-readable medium of claim 14, wherein time aligning the plurality of real timestamps further comprises applying a fit function to the plurality of real timestamps and to the plurality of detected events to determine a value for the first offset timestamp.

16. The non-transitory computer-readable medium of claim 12, further comprising the steps of:
time adjusting a plurality of real timestamps for a plurality of established events for the video file using the plurality of offset timestamps for the plurality of detected events, wherein a real timestamp for an established event indicates an actual time that the established event occurred.

17. The non-transitory computer-readable medium of claim 16, wherein time adjusting comprises:
for at least one established event in the plurality of established events, determining a corresponding detected event in the plurality of detected events; and
adjusting the real timestamp for the at least one established event based on the offset timestamp of the corresponding detected event.

18. The non-transitory computer-readable medium of claim 10, wherein a detected event comprises a plurality of video frames of the video file, the offset timestamp for the event representing the plurality of video frames.

19. A system configured for detecting events in a video file, including:
a memory unit;
a processor coupled to the memory unit and configured for:
determining a plurality of detected events of the video file using an audio track of the video file, an event comprising a scene of interest in the video file, the plurality of detected events having a corresponding plurality of offset timestamps, each offset timestamp indicating an amount of time that has elapsed between the beginning of the video file and the detected event; and
time adjusting a plurality of real timestamps for a plurality of established events for the video file using the plurality of offset timestamps for the plurality of detected events.

20. The system of claim 19, wherein the time adjusting comprises:
for at least one established event in the plurality of established events, determining a corresponding detected event in the plurality of detected events; and
adjusting a real timestamp for the at least one established event based on the offset timestamp of the corresponding detected event.

21. A non-transitory computer-readable medium storing program instructions that, when executed by a processor, cause the processor to execute a user interface (UI) for searching and playing various events included in a plurality of video files, by performing the steps of:
receiving an attribute value for each of a first attribute and a second attribute associated with a first event;
searching event metadata associated with the plurality of video files to determine a plurality of matching events, wherein each matching event corresponds to one of the video files, and the event metadata associated with the one video file includes at least two different matching attributes,
wherein each matching attribute has a value matching the attribute value associated with the first attribute and the attribute value associated with the second attribute, and
wherein the event metadata is based on one or more audio criteria that characterize one or more different events and have been determined by analyzing audio tracks associated with the plurality of video files; and
displaying representations of the plurality of matching events on a two-dimensional grid having a horizontal axis representing the first attribute and a vertical axis representing the attribute.

22. The non-transitory computer-readable medium of claim 21, wherein receiving an attribute value for the first and second attributes comprises:

receiving a first attribute value for the first attribute via a first single-attribute controller, the first attribute value comprising a discrete value and the first single-attribute controller for receiving a finite number of possible values; and receiving a second attribute value for the second attribute via a second single-attribute controller, the second attribute value comprising a continuous value and the second single-attribute controller for receiving a value between a predetermined maximum and minimum value.

23. The non-transitory computer-readable medium of claim 21, wherein:

the event metadata is stored in a database for storing event metadata for a collection of video files; and the plurality of matching events span across a plurality of different video files.

* * * * *